United States Patent Office 2,894,008
Patented July 7, 1959

2,894,008

6-METHYL-17-HYDROXY-21-HALO-4,6-PREGNA-DIENE-3,20-DIONES AND ESTERS THEREOF

Paul B. Sollman, Skokie, Ill.

No Drawing. Application November 28, 1958
Serial No. 776,734

4 Claims. (Cl. 260—397.47)

The present invention relates to new 6-methyl-21-halopregnene derivatives and more particularly to compounds of the structural formula

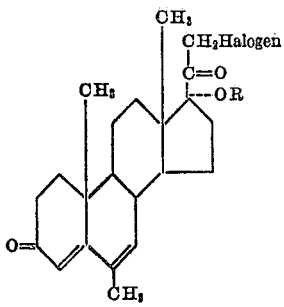

wherein R is a member of the class consisting of hydrogen and radicals of the type —CO-(lower alkyl). The halogen in the above formula can be chlorine, bromine, and iodine, but is preferably fluorine. The lower alkyl radicals include methyl, ethyl, propyl, butyl, pentyl, and hexyl.

The compounds of this invention can be prepared by treating 6-methyl-17-hydroxyprogesterone with iodine in a suitable solvent, such as tetrahydrofuran, in the presence of a catalyst, such as calcium oxide, to form the 4,6-pregnadien-21-iodo derivative. This compound can then be converted to the 21-chloro derivative by refluxing with lithium chloride. The alcohol can be acylated with the appropriate acyl group. The 21-chloro-17-ol derivative is preferably converted to the 21-fluoro derivative by treatment with silver fluoride. The 6-methyl-17-hydroxy-21-fluoro-4,6-pregnadiene-3,20-dione is then esterified to the desired 17-acyloxy derivative by use of the acid and acid anhydride.

The compounds of this invention are highly active progestational agents.

This invention will be further illustrated by the following examples, which are to be construed as illustrative only and not limiting the invention either in spirit or in scope. It will be apparent to those skilled in the art of organic synthesis that many modifications both of materials and methods may be practiced without departing from this invention. In these examples, quantities of materials are given in parts by weight and temperatures in degrees centigrade (° C.).

Example 1

A solution of 20 parts of 6α-methyl-17α-hydroxyprogesterone in 145 parts of freshly distilled tetrahydrofuran is cooled in an ice bath and then 30 parts of iodine and 30 parts of powdered calcium oxide are added to the solution. The suspension is stirred in the ice bath for 5 minutes and then removed. After being vigorously stirred at room temperature for approximately 45 minutes the initial brown color disappears and the suspension turns yellow. The suspension is then poured into a mixture of 3000 parts of water, 700 parts of ice and 136 parts of acetic acid. The precipitate which forms is removed by filtration and is washed with water. In this manner there is obtained crude 6-methyl-17α-hydroxy-21-iodo-4,6-pregnadiene-3,20-dione which exhibits infrared maxima at 2.76, 5.81, 5.98, 6.14, and 6.32 microns in chloroform solution.

Example 2

The filter cake is dissolved in 935 parts of dichloromethane and the solution is decolorized by shaking with several portions of aqueous sodium thiosulfate, and then concentrated to dryness under vacuum.

One hundred parts of silver fluoride are placed in the thimble of a Soxhlet extractor and extracted for 150 minutes with 705 parts of anhydrous acetonitrile. A mixture of 30 parts of the iodo compound obtained in the preceding example and 4 parts of silver oxide is added to the acetonitrile solution and refluxing in the Soxhlet apparatus is continued for 16 hours. The solution is then filtered, concentrated to about 200 parts and added to about 1000 parts of water. This solution is extracted with ethyl acetate. The extract is washed with water, dried over sodium sulfate, and distilled to dryness under vacuum. In this manner there is obtained the crude 6-methyl-17α-hydroxy-21-fluoro - 4,6 - pregnadiene-3,20-dione which exhibits infrared maxima at 2.75, 5.76, 6.03, 6.20, and 6.32 microns in chloroform solution.

Example 3

The crude fluoro compound of the preceding example is dissolved in 314 parts of acetic acid and added to a solution of 2.4 parts of p-toluenesulfonic acid and 32.4 parts of acetic anhydride. After standing at room temperature for 16 hours, the solution is poured into 6000 parts of ice water which contains 100 parts of sodium bicarbonate. The precipitate is collected by filtration, washed with water and dried. The product is dissolved in benzene and applied to a chromatography column containing neutral alumina. Upon elution with a 1% solution of ethyl acetate in benzene and recrystallization from a mixture of acetone and petroleum ether there is obtained 6-methyl-17α-acetoxy-21-fluoro-4,6-pregnadiene-3,20-dione melting at about 221.5–222.5° C. The compound shows absorption in the ultraviolet at 288 millimicrons with an extinction coefficient of 23,300. Infrared maxima are observed at 5.73, 5.99, 6.13, 6.31, 7.88, and 8.05 microns in a potassium bromide disk.

Example 4

Fifteen parts of the crude fluoro compound as obtained in Example 2 are dissolved in 550 parts of caproic acid and added to a solution of 3 parts of p-toluenesulfonic acid and 58 parts of caproic anhydride. After standing at room temperature for 5 days, the solution is poured into 7000 parts of ice water which contains 100 parts of sodium bicarbonate. The precipitate is collected by filtration, washed with water and dried. The product is dissolved in benzene and applied to a chromatography column containing neutral alumina. Upon elution with a 1% solution of ethyl acetate in benzene and recrystallization from a mixture of acetone and petroleum ether there is obtained 6-methyl-17α-hexanoyloxy-21-fluoro-4,6-pregnadiene-3,20-dione. Infrared maxima are observed at 5.73, 5.99, 6.13, 6.31, and 8.51 microns in a potassium bromide disk. The ultraviolet absorption maximum is at 288 millimicrons with an extinction coefficient of about 23,000.

Example 5

A solution of 1 part of 6-methyl-17α-hydroxy-21-iodo-4,6-pregnadiene-3,20-dione in 44.5 parts of dimethylformamide and 10 parts of lithium chloride is refluxed for 15 hours. At the end of this time the solution is poured into 200 parts of water and the precipitate which forms is collected by filtration. The precipitate, 6-methyl-17α-hydroxy-21-chloro - 4,6 - pregnadiene - 3,20-dione, is dissolved in 52.5 parts of acetic acid, 5.4 parts of acetic anhydride and 0.5 parts of p-toluenesulfonic acid. This solution is allowed to stand at room temperature for 15 hours and is then poured into 100 parts of water. The precipitate is collected by filtration and recrystallized from a mixture of acetone and petroleum ether to yield 6-methyl-17α-acetoxy-21-chloro - 4,6 - pregnadiene - 3,20-dione, which shows absorption in the infrared at 5.77, 5.98, 6.13, 6.31, 7.90, and 8.05 microns in a potassium bromide disk.

What is claimed is:
1. A compound of the structural formula

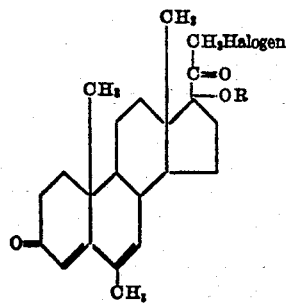

wherein R is a member of the class consisting of hydrogen and radicals of the type —CO-lower alkyl.

2. A compound of the structural formula

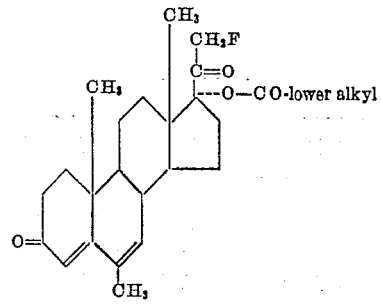

3. 6-methyl-17α-acetoxy-21 - fluoro - 4,6 - pregnadiene-3,20-dione.

4. 6-methyl-17α-hexanoyloxy-21 - fluoro - 4,6 - pregnadiene-3,20-dione.

No references cited.